United States Patent [19]

Feldman

[11] Patent Number: 4,739,351
[45] Date of Patent: Apr. 19, 1988

[54] VERIFICATION OF ON-LINE FAULT MONITOR PERFORMANCE

[75] Inventor: Paul H. Feldman, Commack, N.Y.

[73] Assignee: Hazeltine Corporation, Commack, N.Y.

[21] Appl. No.: 932,054

[22] Filed: Nov. 18, 1986

[51] Int. Cl.⁴ .............................................. G01S 7/40
[52] U.S. Cl. ................................... 342/169; 342/172; 342/173; 340/515
[58] Field of Search ............... 342/165, 169, 170, 172, 342/173, 35; 340/515

[56] References Cited

U.S. PATENT DOCUMENTS

| | | | |
|---|---|---|---|
| 3,932,870 | 1/1976 | Shapiro et al. | 342/173 X |
| 4,138,678 | 2/1979 | Kirner | 342/169 X |
| 4,195,300 | 3/1980 | Gouley | 342/169 X |
| 4,333,081 | 6/1982 | Höfgen | 342/173 X |
| 4,423,418 | 12/1983 | Pearlman | 342/169 |
| 4,532,517 | 7/1985 | LaBerge et al. | 342/173 X |
| 4,625,209 | 11/1986 | Lawrence et al. | 342/169 |
| 4,644,357 | 2/1987 | Schaaf et al. | 342/169 X |

Primary Examiner—T. H. Tubbesing
Assistant Examiner—John B. Sotomayor

[57] ABSTRACT

Proper operation of a system fault monitor is verified while the monitor is coupled on-line with the system and to an alarm line. During periods when actual system signals are produced, the monitor is coupled through one of two time delay circuits to the alarm line. During periods when no actual signals are produced by the system, the monitor input is switched to an error signal generator and the monitor output is coupled through the other time delay circuit to processing circuitry which detects the presence of the alarm signal after the circuit time delay. If no alarm signal is detected, a failure of the monitor and/or delay circuit is indicated.

7 Claims, 3 Drawing Sheets

VERIFICATION OF ON-LINE FAULT MONITOR PERFORMANCE

BACKGROUND OF THE INVENTION

1. Field of the Invention

The present invention relates both to a process and a test circuit for verifying proper operation of a system fault monitor, and more particularly to a method and test circuit in which the monitor is connected with the system when actual system signals are produced, and is connected to receive signals corresponding to erroneous system signals for monitor verification during those times no actual system signals are produced.

2. Description of the Prior Art

System fault monitors are commonly used in a variety of electrical systems where it is essential to alert the system operator of a malfunction, so that appropriate measures can be taken by the operator.

An important example arises in the context of a microwave landing system (MLS). Basically, a MLS employs an azimuth (AZ) phased array antenna which scans its radiated beam "to" and "fro" periodically in the horizontal direction, and an elevation (EL) phased array antenna which scans its beam up and down periodically in the vertical direction. Equipment on board an aircraft approaching a runway equipped with a MLS, counts the time period between reception of the beam from the AZ antenna on its "to" scan and reception of the beam on the "fro" scan. The counted time difference corresponds to a unique azimuth heading of the aircraft relative to the AZ antenna. By a corresponding time-difference counting operation with respect to the scanning beam from the EL antenna, the aircraft equipment determines a unique elevation angle for the craft relative to the EL antenna. Since both the AZ and EL antennas are located adjacent the runway employing the MLS, the pilot thus receives information which is critical in determining a proper glide path for a safe landing on the runway.

It will be appreciated that precise timing of the scanning operation of both the AZ and EL antennas is essential in order to provide accurate glide path information to the aircraft pilot. Any system malfunction resulting in a deviation of the timing of the scanning beams from either the AZ or the EL antennas from a predetermined time sequence, will cause the onboard equipment to produce erroneous heading information.

Radio frequency (RF) probes serve as monitors in a MLS, by (a) detecting the strength of the wave energy radiated from the AZ and EL antennas at different points in space while the beams scan "to and fro" and "up and down", and (b) determining the detected energy levels lie within predetermined limits. Through the use of a number of RF probes or monitors at appropriate locations relative to the MLS antennas, it can be established whether or not the instantaneous scan angle of the radiated beams, and the effective radiated power of the main lobe and side lobes of each beam, meet system specifications. If not, the entire system must be shut down after a fault condition exists for a certain time to avoid erroneous heading information to develop on board an approaching aircraft. That is, false guidance to the aircraft presents a worse situation than no guidance at all since, in the latter case, the pilot may resort to other available instrument approach systems, land entirely visually if possible, or abort the landing and continue to another runway with properly operating facilities.

The system monitors employed in a MLS are typically analog to digital devices and are themselves subject to erroneous operation due to component failure, circuit board fracture, cable/connector breakage and the like. Therefore, in order to ensure that the system monitors are themselves working properly, a monitor verification routine is carried out periodically, usually at times during which the monitor being verified is not called upon to detect an active scanning beam of the MLS. For example, a monitor positioned to detect a scanning EL beam does not produce useful data during the scan period of the AZ beam, and vice versa.

Basically, monitor verification calls for the purposeful injection of false signals into selected monitors while the monitor output signals are observed by a controlling computer or processor. While the false data is injected, the selected monitor output should indicate the presence of erroneous input data. On-line monitors are generally combined with counters, time delay or other filter means so that an output indicative of an erroneous input to the monitor is produced only if the error signal is input to the monitor over a predetermined time (e.g., 0.8 seconds). Such filtering of error data thus reduces the number of false alarms from a given monitor to a minimum.

A problem in monitor verification with monitors employing such filter means arises, however, in that the false error signals must persist at the monitor input for a time greater than the filter delay time to allow the controlling processor to determine if the selected monitor has detected an error. That is, in order to test the monitor properly, it must be taken "off line" for at the least the filter delay time. A continuous off line time of 0.8 secs. is not tolerable in a MLS system for some of the system monitors which must be actively connected on-line within shorter time periods.

A known arrangement which overcomes the problem of taking a given monitor off-line for an extended time to verify proper monitor operation in a MLS involves implementing a change in the monitor filter delay value. This change is accomplished by the controlling processor prior to a verification operation, so that when only one more false error signal is input to the monitor the filter time value is exceeded and the monitor should indicate such error at its output if working properly. Although such changing of the monitor filter parameters overcomes the problem of taking the monitor off-line for an intolerable period of time, another problem arises in that the filter circuits themselves cannot be tested simultaneously with the monitor for proper operation.

SUMMARY OF THE INVENTION

An object of the invention is to overcome the above and other shortcomings in the known monitor verification schemes.

Another object of the invention is to provide a test circuit for verifying proper operation of a fault monitor together with any time delay or filter means with which the monitor may be associated.

A further object of the invention is to provide a test circuit for verifying proper operation of a fault monitor, in which the monitor is connected on-line with the monitored system at all times during which the system is active.

Still another object of the invention is to provide a monitor verification scheme in which the controlling processor in no way alters the monitor filter parameters during verification, thus, increasing overall system integrity.

According to the invention, a circuit for verifying proper operation of a fault monitor includes means for generating, during inactive time periods of the monitored system, an erroneous signal such as to induce the monitor to generate an alarm signal which would be generated by the monitor when a like erroneous signal is produced by the system during operating time periods of the system, and first switch means for selectively switching an input of the monitor to connect with a source of actual system signals to be monitored during the operating time periods, and with an output of the false signal generating means during the inactive time periods.

First and second filter means are provided each for retarding, by a certain duration, a signal coupled to an input of each filter means. Second switch means selectively switches an output of the monitor to the input of the first filter means, and third switch means selectively switches the output of the monitor to the input of the second filter means. Alarm line connect means connects a selected output of the first and the second filter means to an alarm line.

Processing means coupled to the false signal generating means is adapted to control operations of the first through fourth switch means, so that in a given test interval (a) the first switch means is set during the system operating time periods to connect the monitor input with the actual system signals, the second switch means is closed and the third switch means is open so that output signals from the monitor are applied only to the first filter means, (b) during the inactive system time periods the first switch means is set to connect the monitor output with the output of the false signal generating means, the third switch means is closed and the second switch means is open so that output signals from the monitor are applied only to the second filter means, and (c) the alarm line connect means connects the alarm line to the output of the first filter means.

The processing means includes means for determining when the erroneous signal has been provided to the monitor input for the certain duration retarding time of the filter means, and first verifying means coupled to the output of the second filter means to detect the presence of the alarm signal after said certain duration.

In a preferred embodiment, the processing means includes means for reversing, in an alternate test interval, the operating states of the second and the third switch means and the alarm line connect means so that (a) during the system operating time periods the second switch means is open and the third switch means is closed so that output signals from the monitor are applied only to the second filter means, (b) during the inactive time periods the third switch means is open and the second switch means is closed so that output signals from the monitor are applied only to the first filter means, and (c) the alarm line connect means is set to connect the alarm line to the output of the second filter means.

Second verifying means is coupled to the output of the first filter means to detect the presence of the alarm signal after the erroneous signal has been provided to the monitor input for the certain duration retard time of the filter means.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
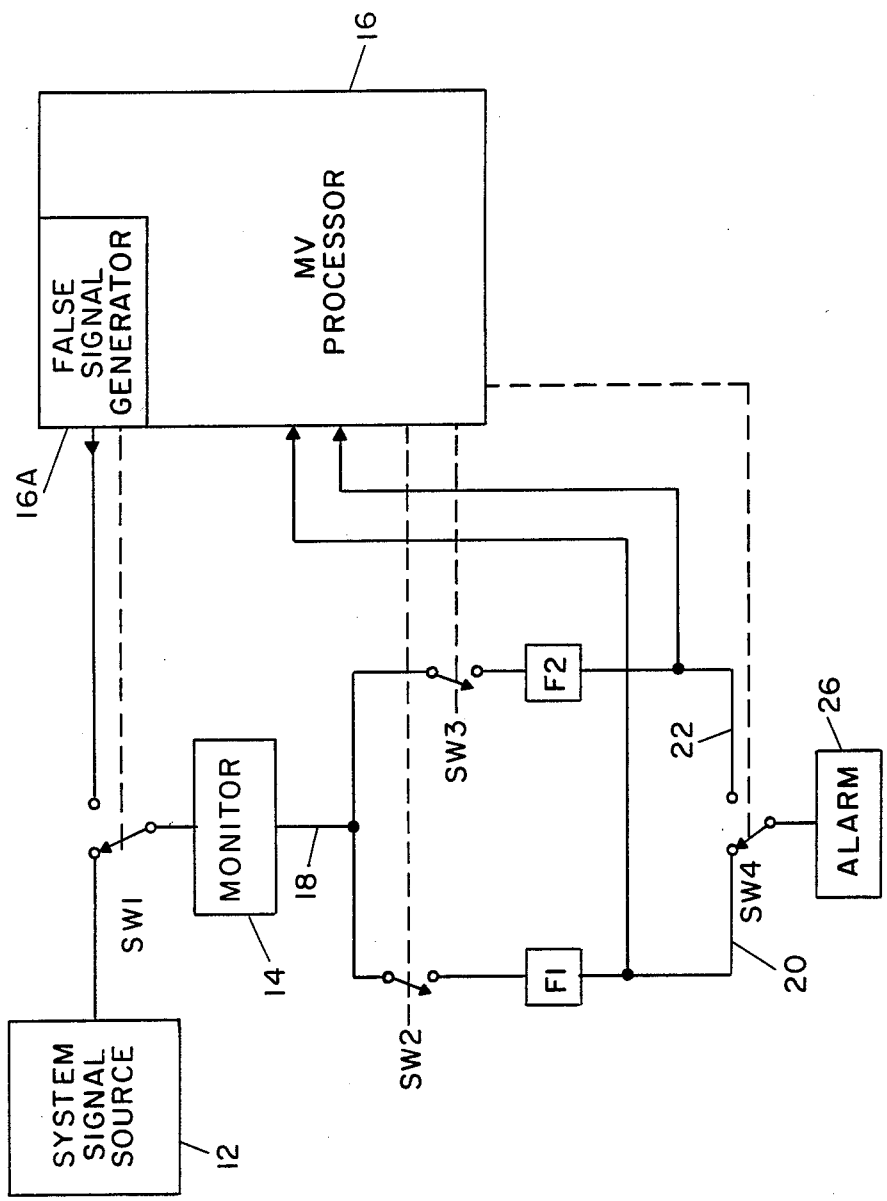
FIG. 1 is a schematic block diagram of a test circuit for verifying proper operation of a fault monitor, according to the invention, and FIGS. 2A and 2B comprise a flow chart illustrating a sequence of operations in the circuit of FIG. 1.

FIG. 1 shows a system signal source 12 to which a fault monitor 14 is connected through a switch SW1 at times determined by a monitor verification (MV) processor 16. The system signal source 12 may be, in MLS applications, the output of a RF probe selected among a number of similar probes fixed in space at various positions relative to the MLS antenna installation. Outputs from the various RF probes should, during normal system operation, be confined within preset limits, so that a monitored deviation from such limits is indicative of a system fault or malfunction. MLS parameters which are monitored through the use of a number of RF probes or signal sources 12 include scanning beam mean angle error, function preamble effective radiated power (ERP), scanning beam ERP, clearance ERP, and out-of-coverage indicator ERP.

Thus, although only one signal source 12 is illustrated in FIG. 1, it will be understood that a single monitor 14 may be switched under a time multiplex scheme to receive the outputs of a number of RF monitoring probes and operate to provide an alarm signal on line 18 when the signal level input to the monitor 14 exceeds preset limits for the switched-in signal source 12.

The output of monitor 14 is connected to a filter circuit F1 through a switch SW2 the ON and OFF state of which is controlled by the MV processor 16. The monitor output on line 18 is also connected to another filter circuit F2 through a switch SW3 the ON and OFF state of which is controlled by the MV processor 16. Filter circuits F1 and F2 can be, for example, time delay or retarding means such as counters, delay lines or digital filter circuits as are already known to those skilled in the art. Filter circuits F1 and F2 should be substantially identical to one another, and operate to delay or accumulate an error signal from the monitor 14 for a certain time duration, typically 0.8 sec. This serves to reduce the occurrence of "false" alarms by suppressing transient error signals which may arise due to reasons other than a system malfunction.

When an alarm signal is provided by monitor 18 to an input of either filter circuit F1, F2 for a period in excess of the filter circuit time delay, a filter circuit output signal is produced on corresponding output lines 20, 22. If an output line 20, 22 on which a filter circuit output signal is present is connected to an alarm line 24 through a switch SW4, alarm circuitry 26 is activated. Operation of the switch SW4 is controlled by the MV processor 16.

The alarm circuitry 26 should operate to shut the monitored system off and provide suitable indications of a fault condition to those operating personnel who can take appropriate corrective measures.

Operation of the present monitor verification scheme will now be explained with reference to FIGS. 2A and 2B. It will be appreciated that the present scheme enables verification of both the monitor 14 and its associated filter circuits F1, F2, without requiring that the monitor 14 be taken off-line during those times the signal source 12 provides actual signals.

After start-up, the MV processor 16 operates to place switch SW1 in the position shown in FIG. 1, i.e., connected to the system signal source 12 in step S1. Also, switches SW2 and SW3 are closed, and switch SW4 is connected to output line 20 from filter circuit F1.

In step S2, the processor 16 waits for a time period equal to about 5 filter time constants (or delays) associated with the filter circuits F1, F2 and, in step S3, the output of filter circuit F2 is read by the processor 16. It will be understood that the value of the output of F2 is indicative of the period of time, if any, that an alarm signal has been input to F2. Based on the F2 output reading, the processor 16 determines in step S4 the additional time needed to input an alarm signal to F2 so as to realize an alarm output on line 22. That is, the time period over which a false error signal is to be provided from a false signal generator 16a to the input of monitor 14 while the monitor output is connected through line 18 and switch SW3 to filter circuit F2, so as to cause the latter to output an alarm signal on line 22, is calculated by the processor 16 in step S4.

A first test interval is initiated in step S5 during which the processor 16 continuously senses if the system is active, i.e., whether or not actual signals are being provided by the source 12. If the system is active, then in step S6 the state of switch SW3 is changed to OPEN while the remaining switch states are maintained as in step S1. Thus, during the first test interval, the monitor 14 remains connected on-line with the signal source 12 whenever the system is active, and filter circuit F1 is connected to the monitor output so as to suppress or inhibit transient false alarm signals from activating the alarm circuitry 26.

If, during S5, it is determined that the system is inactive, then the processor 16 connects the monitor 14 through switch SW1 to the false signal generator 16a. Also, switch SW2 is opened and switch SW3 is closed in step S7. The processor 16 maintains a count of the time that switch SW1 is connected to the output of the false signal generator 16a in step S8 and, when it is determined that the false signals are input to the monitor 14 from the generator 16a for a period equal to the false signal test time determined in step S4, the output of filter circuit F2 is again read by the processor 16 in step S9.

If the monitor 14 and filter circuit F2 are operating properly, the output of F2 should indicate an alarm condition. If so, a "pass" condition for the monitor 14 and the filter circuit F2 is established in S10 and the operating sequence for the arrangement of FIG. 1 proceeds to the switch conditions shown in step S11 (FIG. 2B). That is, switch SW1 is maintained connected to the system signal source 12, switches SW2 and SW3 are both closed, and switch SW4 is connected to the output of filter circuit F1 through the line 20.

If in step S9 no alarm condition signal is read by the processor 16 at the output of filter circuit F2, an indication is made in step S12 that the monitor 14 and/or filter circuit F2 have failed verification, and the system is shut off.

Assuming a pass condition for monitor 14 and circuit F2, the routine continues after step S11 to a wait period of five filter time constants or delays in step S12. The output of filter circuit F1 is read by the processor 16 in step S13 and, similar to the operation in step S4, the processor determines the period of time a false signal must be applied from the generator 16a to the monitor input through switch SW1 to cause an alarm condition signal to appear at the output of F1 on line 20, in step S14.

A second or alternate test interval is then initiated in step S15 wherein the processor 16 again continuously senses if the system is active, i.e., whether or not actual signals are being provided by the signal source 12. If so, then in step S16 the state of switch SW2 is changed to OPEN, switch SW4 changes to F2 and switch SW3 remains closed as in step S11. Accordingly, during active system time, monitor 14 is connected on line through switch SW1 to the signal source 12 and filter circuit F2 operates to suppress transient alarm signals from the monitor 14 which would otherwise cause the alarm circuitry 26 to be activated through switch SW4.

During periods of system inactivity, the processor 16 causes in step S17 switch SW1 to connect monitor 14 to the false signal generator 16a, the switch SW2 to close and switch SW3 to open whole switch SW4 remains connected to F2 output line 22.

In step S18 the processor 16 maintains a count of the time that SW1 is connected to false signal generator 16a and, when such time equals the false signal test time calculated in step S14, the processor 16 again reads the output of circuit F1 in step S19. If an alarm condition signal is read on output line 20, an indication is made in step S20 that the monitor 14 and filter circuit F1 pass verification. If no alarm condition output is read in step S19, an indication is made in step S21 that monitor 14 and/or circuit F1 have failed verification, and the system is shut off.

Figure 2A:
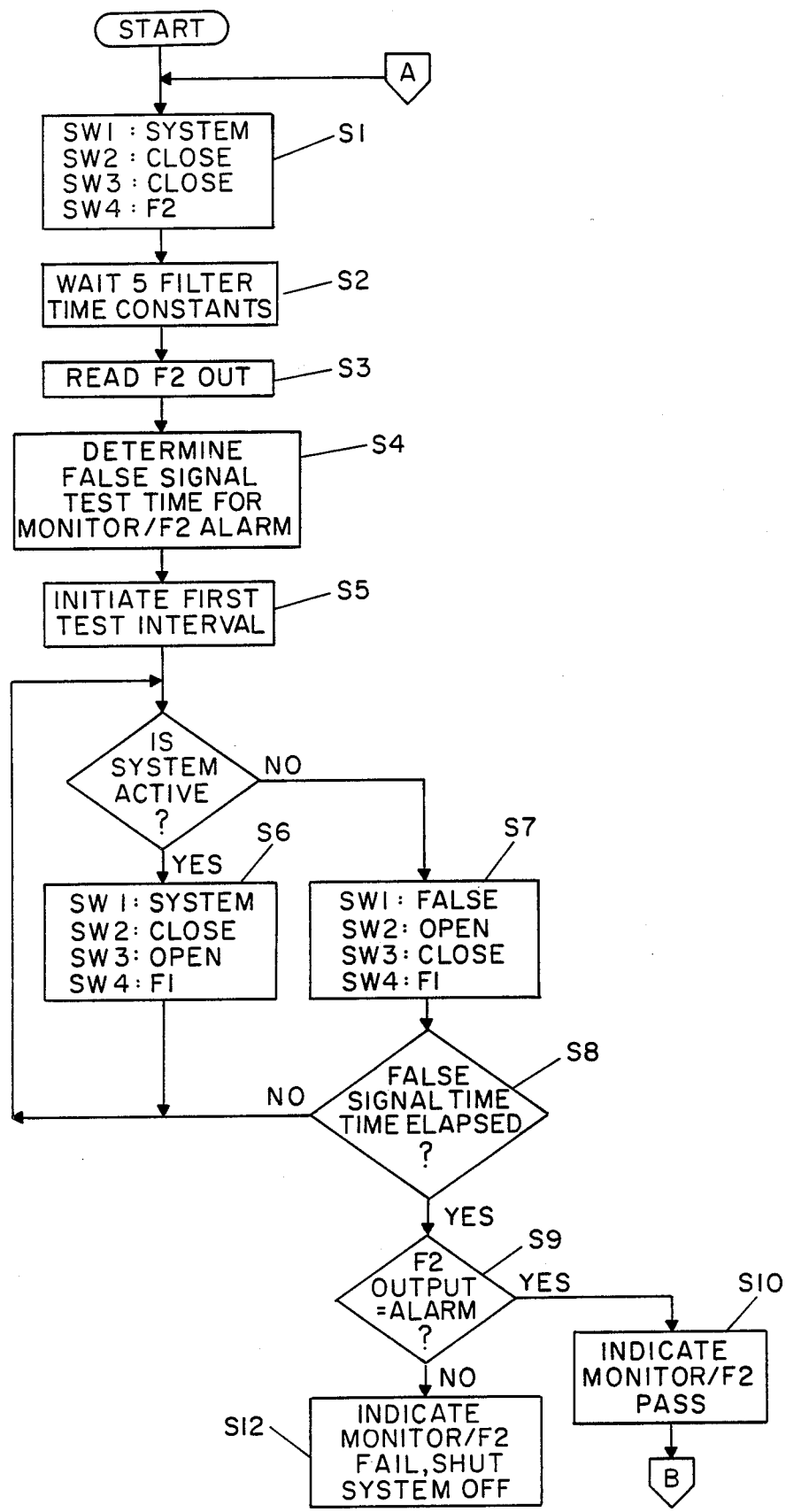
Figure 2B:
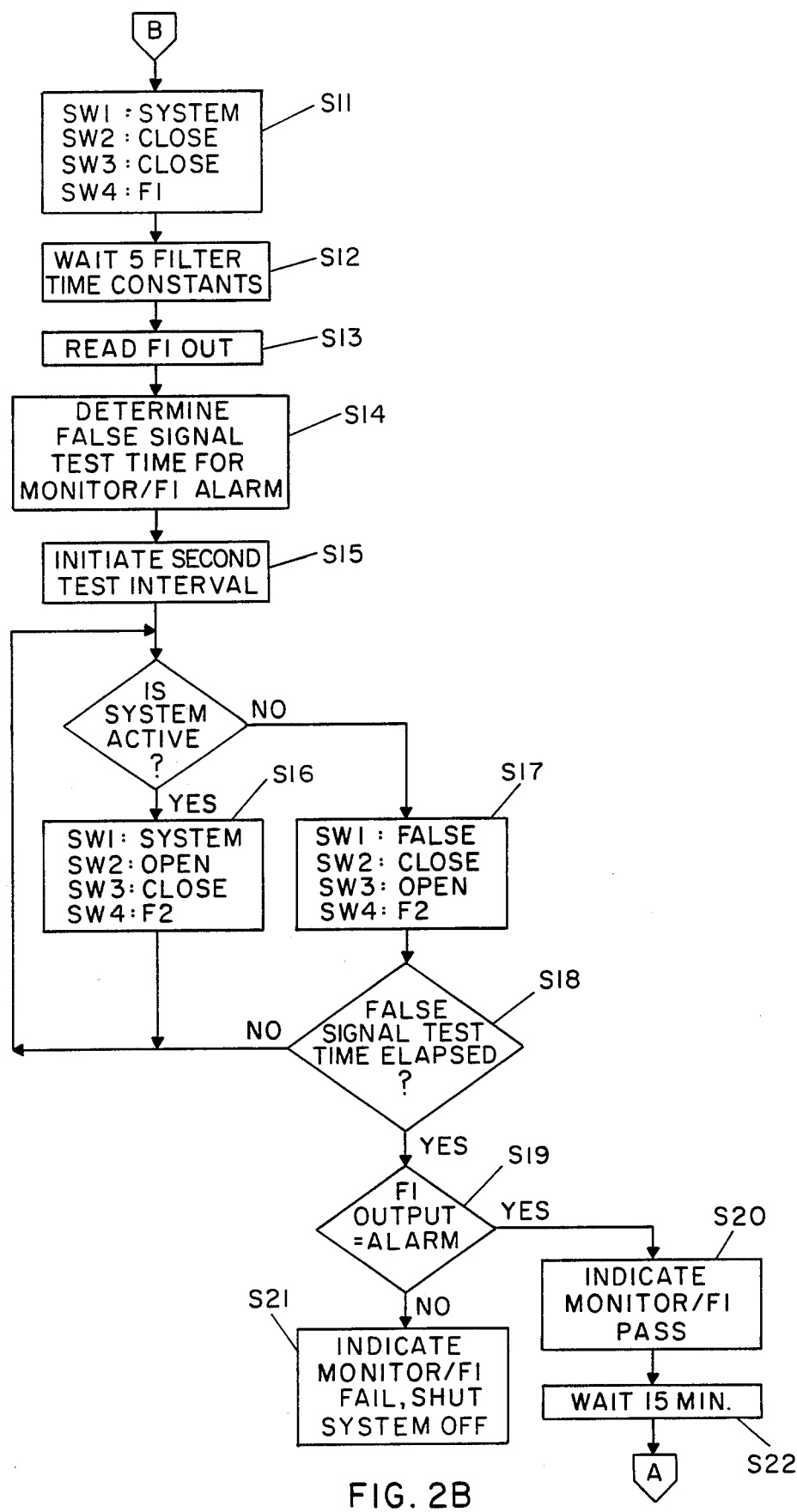

Assuming that monitor 14 and F1 pass, the processor 14 awaits a time period of about 15 minutes and then returns to step S1 to initiate the first test interval represented in FIG. 2A.

Specific structural details for the MV processor 16 would be apparent to one skilled in the art in light of the disclosure herein. For example, processor 16 can be made in the form of a single integrated circuit (IC) chip, including a read only memory (ROM) for storing a program to carry out the process shown in FIGS. 2A and 2B and described herein, an arithmetic logic unit to carry out calculations and effect the program flow, a random access memory (RAM) for storing intermediate and final calculations, and an interface portion for electrically coupling control electrodes of the switches SW1–SW4 and the outputs of filter circuits F1, F2 to input/output circuits within the processor 16.

While the foregoing description represents a preferred embodiment of the invention, it will be obvious to those skilled in the art that various advantages and modifications may be made, without departing from the true spirit and scope of the invention.

What is claimed:

1. A test circuit for verifying proper operation of a fault monitor coupled on-line between a source of actual system signals and an alarm line, the system being inoperative at certain inactive time periods so that the actual signals are produced periodically over known operating time periods, said circuit comprising:

means for generating during said inactive time periods, an erroneous signal operative to induce the monitor to generate an alarm signal that is to be generated by the monitor when a like false signal is produced by the system during said operating time periods, first switch means for selectively switching an input of the monitor to connect with the source of actual system signals during said operating time periods and with an output of said false signal generating means during said inactive time periods;

first and second filter means each for retarding by a certain duration a signal applied to an input of the filter means;

second switch means for selectively switching an output of the monitor to the input of said first filter means;

third switch means for selectively switching the output of the monitor to the input of said second filter means;

alarm line connect means for connecting a selected output of said first and said second filter means to said alarm line; and processing means coupled to said false signal generating means and adapted to control operations of said first to said third switch means and said alarm line connect means, so that in a given test interval (a) said first switch means is set during the known operating time periods to connect the monitor input with the source of actual system signals, said second switch means is closed and said third switch means is open so that output signals from the monitor are applied only to said first filter means, (b) during said inactive time periods the first switch means is set to connect the monitor input with the output of said false signal generating means, the third switch means is closed and the second switch means is open so that output signals from the monitor are applied only to said second filter means, and (c) said alarm line connect means is set to connect the alarm line to the output of said first filter means;

wherein said processing means includes means for determining when said false signal has been provided to the monitor input for said certain duration, and first verifying means coupled to the output of said second filter means for detecting the presence of the alarm signal after said certain duration.

2. A test circuit according to claim 1, wherein said processing means includes means for reversing, in an alternate test interval, the operating states of said second and said third switch means and said alarm line connect means, so that (a) during the known operating time periods of the system, said second switch means is open and said third switch means is closed so that output signals from the monitor are applied only to said second filter means, (b) during the inactive time periods of the system said third switch means is open and said second switch means is closed so that output signals from the monitor are applied only to said first filter means, and (c) said alarm line connect means is set to connect the alarm line to the output of said second filter means, and second verifying means coupled to the output of said first filter means for detecting the presence of the alarm signal after said false signal has been provided to the monitor input for said certain duration.

3. A test circuit according to claim 1, including fail alert means associated with said first verifying means for signaling the absence of the alarm signal from said second filter means after said certain duration.

4. A test circuit according to claim 2, including first fail alert means associated with said first verifying means for signaling the absence of the alarm signal from said second filter means after said certain duration, and second fail alert means associated with said second verifying means for signaling the absence of the alarm signal from said first filter means after said certain duration.

5. A process for verifying proper operation of a fault monitor coupled on-line between a source of actual system signals and an alarm line, the system being inoperative at certain inactive time periods so that the actual signals are produced periodically over known operating time periods, the process comprising the steps of:

generating, during the inactive time periods, an erroneous signal for inducing the monitor to generate an alarm signal which would otherwise be generated by the monitor when a like erroneous signal is produced by the system during the operating time periods;

switching an input of the monitor to connect with the source of actual system signals during the operating time periods of the system, and with the generated erroneous signal during the inactive time periods;

retarding by a certain duration an output of the monitor with first filter means during said operating time periods in a given test interval;

retarding by said certain duration the output of the monitor with second filter means during said inactive time periods in said given test interval;

connecting an output of the first filter means with the alarm line in said given test interval; and detecting the presence of the alarm signal at an output of the second filter means after the erroneous signal is input to the monitor for said certain duration during said given test interval, thereby verifying that the monitor and the second filter means are properly operating.

6. The process of claim 5, including, during an alternate test interval, retarding the output of the monitor with the first filter means during said inactive time periods of the system, retarding the output of the monitor with the second filter means during said operating time periods, connecting the output of the second filter means with said alarm line, and detecting the presence of the alarm signal at the output of the first filter means after the erroneous signal is input to the monitor for said certain duration during the alternate test interval, thereby verifying that the monitor and the first filter means are properly operating.

7. A microwave landing subsystem such as an elevation subsystem or an azimuth subsystem wherein the subsystem includes a test circuit for verifying proper operation of a fault monitor coupled on-line between a source of actual subsystem signals and an alarm line, the subsystem being inoperative at certain inactive time periods during operation of another subsystem so that the actual signals are produced periodically over known operating time periods, said subsystem comprising:

first means for generating periodic subsystem signals;

a monitor for monitoring signals generated by said first means;

means for generating during said inactive time periods of said first means, a false signal operative to induce the monitor to generate an alarm signal that is to be generated by the monitor when a like false signal is produced by the first means during said operating time periods, first switch means for selectively switching an input of the monitor to connect with the source of said first means signals during said operating time periods and with an output of said false signal generating means during said inactive time periods;

first and second filter means each for retarding by a certain duration a signal applied to an input of the filter means;

second switch means for selectively switching an output of the monitor to the input of said first filter means;

third switch means for selectively switching the output of the monitor to the input of said second filter means;

alarm line connect means for connecting a selected output of said first and said second filter means to said alarm line; and processing means coupled to said false signal generating means and adapted to control operations of said first to said third switch means and said alarm line connect means, so that in a given test interval (a) said first switch means is set during the known operating time periods to connect the monitor input with the source of said first means system signals, said second switch means is closed and said third switch means is open so that output signals from the monitor are applied only to said first filter means, (b) during said inactive time periods of said first means the first switch means is set to connect the monitor input with the output of said false signal generating means, the third switch means is closed and the second switch means is open so that output signals from the monitor are applied only to said second filter means, and (c) said alarm line connect means is set to connect the alarm line to the output of said first filter means;

wherein said processing means includes means for determining when said false signal has been provided to the monitor input for said certain duration, and first verifying means coupled to the output of said second filter means for detecting the presence of the alarm signal after said certain duration.

* * * * *